United States Patent [19]

Hesselmans et al.

[11] Patent Number: 5,258,481
[45] Date of Patent: Nov. 2, 1993

[54] MULTIFUNCTIONAL WATER-DISPERSIBLE CROSSLINKING AGENTS

[75] Inventors: Laurentius C. J. Hesselmans, 's-Hertogenbosch; Johanna A. M. van den Goorbergh, Waalwijk, both of Netherlands

[73] Assignee: Stahl Holland B. V., Waalwijk, Netherlands

[21] Appl. No.: 862,786

[22] Filed: Apr. 3, 1992

[30] Foreign Application Priority Data

Apr. 3, 1991 [NL] Netherlands .......................... 9100578

[51] Int. Cl.$^5$ ............................................. C08G 18/80
[52] U.S. Cl. ........................................ 528/28; 528/45; 528/69; 528/73; 528/75; 528/76; 528/77; 564/252; 252/182.13; 252/182.23
[58] Field of Search ...................... 528/28, 45, 69, 73, 528/75, 76, 77; 564/252; 252/182.13, 182.23

[56] References Cited

FOREIGN PATENT DOCUMENTS 0241805 10/1987 European Pat. Off. .
0274402 7/1988 European Pat. Off. .
0277361 8/1988 European Pat. Off. .

*Primary Examiner*—Maurice J. Welsh
*Attorney, Agent, or Firm*—Kane, Dalsimer, Sullivan, Kurucz, Levy, Eisele & Richard

[57] ABSTRACT

The invention describes a new type of multi-functional water-dispersible crosslinking agents. These crosslinking agents are products consisting of oligomeric compounds containing carbodiimide functions and other reactive functional groups. Further the invention describes aqueous dispersions, emulsions or solutions with such crosslinking agents. Finally the invention comprises a process for the preparation of the crosslinking agent according to the invention.

43 Claims, No Drawings

MULTIFUNCTIONAL WATER-DISPERSIBLE CROSSLINKING AGENTS

This invention relates to a new type or multi-functional water-dispersible composition, to the preparation of such a composition and the use of such a composition as a crosslinking agent in a dispersion, emulsion, or solution of a polymer containing carboxylic groups.

INTRODUCTION

Industrial coatings are prepared to protect and decorate underlying materials. Originally, these coatings were primarily solvent-borne systems, but the development of water-borne coatings has become of increasing interest for a number of reasons. The main reasons for the shift from solvent-borne coatings to aqueous alternatives are a decrease in the potential harm to the environment and a lower toxicity.

In the development of water-borne coatings it has become apparent that the quality of the coating performance is often inferior to that of solvent-borne coatings. It is known that the properties of aqueous coatings are improved to a large extent by addition of crosslinking agents. As a consequence there is a need for water-dispersible crosslinking agents which are safe to handle. Specifically, the crosslinking agent should be of low toxicity, particularly of low or non-mutagenicity and of low or non-carcinogenicity.

During the past decennia, several types of crosslinking agent have been developed. Depending on the temperature of curing, the crosslinking agents can be divided in high-temperature baking types and low-temperature baking-types. For application on to temperature sensitive substrates, such as leather and artificial leather, the low-baking types of crosslinking agents are of special interest and several types of these are available commercially. For carboxylic group containing water-borne coatings, polyfunctional aziridine compounds are very effective crosslinkers which can be easily mixed with water or aqueous dispersions. However, such compounds show positive results in mutagenic tests. Polyfunctional azetidine compounds can also act as crosslinkers but such compounds appear to be less efficient than the aziridine compounds. Isocyanates or blocked isocyanates can act as crosslinkers since these compounds react with free amino or hydroxylic groups in a polymer system, or they react with an urethane or amide function to form a biuret.

Alternative crosslinkers which are non-mutagenic are the water-dispersible polycarbodiimide systems, for example as described in European Patent Application Publication Nos. 121083, 0120305 and 027440as well as the aziridine function the carbodiimide function react with carboxylic functions in a polymer system. The polycarbodiimides described aliphatic or cycloaliphatic isocyanates and in the last case formed by dehydration or elimination of hydrogen sulfide of ureum or thiourem functions respectively. They need external surfactants, polar solvents and high shear mixing to be emulsified in water-borne polymer dispersions, emulsions, or solutions. A subsequent development to obtain more water-dispersible and more stable products is described in European Patent Application Publication No 0241805 which discloses surface-active polycarbodiimides wherein, in order to facilitate the emulsification, polycarbodiimides are linked to poly(oxyalkylene) groups.

For the coating of leather and artificial leather, the polycarbodiimide systems appear to be less effective crosslinkers than aziridine compounds. This is believed to be caused, at least partially, by a lower functionality of the polycarbodiimides as compared to the functionality of the polyaziridines (reactive functions: 2.2–2.8 meq/g and 6–7 meq/g at 100% solids, respectively). Besides, the type of crosslinking is different, since the functional groups are wider apart in the case of the polycarbodiimides than with the polyaziridines.

In order to obtain a more effective crosslinking agent it has first been checked out whether the functionality of polycarbodiimides could be raised by making products with higher molecular weight, but in that case products are obtained with a viscosity that is much too high, which are badly dispersible in water and thus badly applicable as crosslinking agent.

An alternative way of increasing the functionality of a crosslinking agent was combining the aziridine functionality with the carbodiimide functionality in one molecule. Advantage of such a compound would be an expected lower mutagenicity with respect to the aziridine crosslinking agents because the molecule has a higher molecular weight and a lower aziridine content. Benefit with respect to the carbodiimide-functional crosslinking agents is that such a compound has a higher total crosslinking functionality at a comparable molecular weight. The compounds containing both carbodiimide functions and aziridine functions showed a higher crosslinking capacity than could be awaited based on their total functionality. An explanation for this may be that the aziridine groups in the crosslinking agent enter also into self-addition reactions besides the awaited reaction with carboxylic groups in an aqueous polymer. This gives rise to a network of coupled ethyleneamine functions throughout the crosslinked polymer system. The compounds with both carbodiimide functions and aziridine functions are, however, mutagenic.

In order to make stronger use of the above-mentioned phenomenon search was made for other possibilities to obtain such a network in a crosslinked polymer system. In the literature it was known that alkoxysilane compounds after hydrolysis enter into condensation reactions with each other. Therefore compounds were made containing both carbodiimide functions and alkoxysilane functions. On application of these compounds as crosslinking agent in an aqueous dispersion, emulsion or solution of a polymer containing carboxylic groups, the carbodiimide functions react with the carboxylic groups of this polymer, while the alkoxysilane groups after hydrolysis condense with each other. Thus a network arises of Si—O—Si bonds throughout the crosslinked polymer and a strongly increased crosslinking capacity is obtained with respect to polycarbodiimide crosslinking agents. Moreover, an important advantage of compounds containing both carbodiimide functions and alkoxysilane functions is that these compounds are non-mutagenic.

Accordingly there still remains a need to provide a highly effective, low toxic, low or non mutagenic, water-dispersible crosslinking agent which is suitable for crosslinking of aqueous dispersions, emulsions and solutions of polymers containing carboxylic groups, of the following types: polymer emulsions made by emulsion polymerisation, especially from esters of acrylic and methacrylic acid, styrene, vinyl chloride, vinylidene chloride, vinyl acetate. Acid comonomers such as acrylic acid and methacrylic acid should be included. Products of suspension polymerisation, aqueous polymer solutions and dispersions of preformed polymers (especially condensation polymers in water). Clearly the preferences are aqueous polyurethanes and aqueous polyesters.

In order to reach this goal a new type of multifunctional water-dispersible product has been developed.

DESCRIPTION OF INVENTION

According to the present invention there is provided a composition which is an oligomeric material which contains carbodiimide functionalities, and a reactive functional group which is other than a carbodiimide functional group.

The composition is an oligomeric material and it will be appreciated that in such materials the amount of each constituent is an average amount.

Typical compositions in accordance with the present invention have the general formula (1):

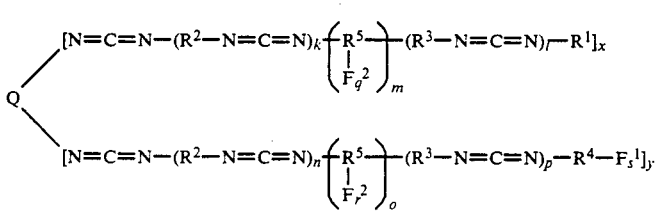

(1)

wherein $R^1$ is a monovalent organic group which has no reactivity towards the carbodiimide functions or the groups $F^1$ and $F^2$;

$R^2$ is a divalent organic group which has no reactivity towards the carbodiimide functions, or the groups $F^1$ and $F^2$;

$R^3$ is a divalent organic group containing hydrophilic segments and has no reactivity towards the carbodiimide functions, or the groups F1 and F2;

$R^4$ is a divalent organic group which has no reactivity towards the carbodiimide functions, or the groups $F^1$ and $F^2$;

$R^5$ is a residue of an organic compound adapted to function as a site for branching between a carbodiimide functional group and a group $F^2$;

Q is a residue of an organic compound adapted to function as a site for branching or is a group $—R^1$ or is a group $—R^4—F^1_s$;

$F^1$ is a reactive functional group other than a carbodiimide functional group;

$F^2$ is a reactive function group other than a carbodiimide functional group.

k has a value of from zero up to ten;
l has a value of from zero up to four;
m has a value of zero up to five;
n has a value of from zero up to ten;
o has a value of zero up to five;
p has a value of zero up to four;
q has a value of one up to six;
r has a value of one up to six;
s has a value of one up to six;
x is zero or has a positive value; and
y has a value of at least one, wherein (x+y) corresponds to the valency of the group Q, and when the value of (x+y) is greater than one, $R^1$, $R^2$, $R^3$, $R^4$, $R^5$, $F^1$, $F^2$, k, l, m, n, o and p may be the same or different in each group attached to the group Q.

Since the compound is an oligomer there is a random distribution of the monomers in the oligomeric chains and k, l, m, n, o and p need not be integers.

In the compositions of the present invention, the group Q may be a monovalent group $—R^1$ or $—R^4—F^1_s$, and the composition then has the general formula (2):

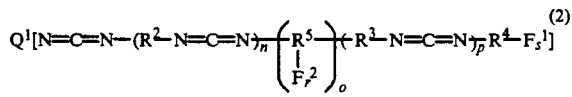

(2)

wherein $R^2$, $R^3$, $R^4$, $R^5$, $F^1$, $F^2$, n, o and p, r and s are all as hereinbefore defined and $Q^1$ is a group $—R^1$ or $—R^4—F^1_s$ where $R^1$ is as hereinbefore defined.

In compositions in which the group Q is a group $—R^4—F^1_s$, and the value of o is zero, the composition has the general formula (3):

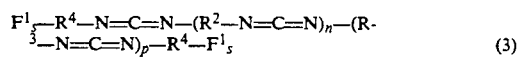

(3)

wherein $R^2$, $R^3$, $R^4$, $F^1$, n and p and a are all as hereinbefore defined Further compositions in accordance with the present invention are those in which Q is a group $—R^1$ and the value of o is zero, such compositions having the general formula (4):

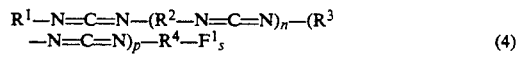

(4)

wherein $R^1$, $R^2$, $R^3$, $R^4$, $F^1$, n and p and s are all as hereinbefore defined.

In order to obtain a proper dispersibility in water and water-borne polymers the compounds of the formulas (1), (2), (3) and (4) preferably contain at least 0.01 of groups $R^1$ or $R^3$, which contain hydrophilic segments. In versions without hydrophilic segments the addition of special emulsifying agents is necessary to allow for dispersion in water of in water-borne polymers.

The carbodiimide functions in the compounds of the formulas (1), (2), (3) and (4) are present in an amount of [x+x(k+1)+y+y(n+p)]. It will be appreciated that, since the composition is oligomeric or polymeric, it will contain molecules of different molecular weight and composition and hence the values of k, l, m, n, o, p, and possibly x and y, may vary in the different molecules and the values for the composition are average values.

Further the oligomeric compounds of the general formulas (1), (2), (3) and (4) as defined hereinabove according to the present invention may be used as excellent crosslinking agents for aqueous dispersions, emulsions or solutions of polymers containing carboxylic groups. These crosslinking agents cure at lower temperatures.

Combination of carbodiimide functions and several functional groups in a product cause an increased crosslinking capacity with respect to the polycarbodiimide crosslinkers. Both the carbodiimide functions and the reactive functional groups contribute to the crosslinking. The carbodiimide functions from formulas (1), (2), (3) and 4 react with the carboxylic groups in the water-borne polymers, whereby a coupling takes place to the polymer.

The reactive functional groups contribute, depending on the type, in a different manner to the crosslinking:

by reactions with reactive functions in the polymers on an aqueous basis. Specific examples hereof in the present invention are compounds of the formulas (1), (2), (3) and (4), whereby the reactive functional group is a reactive ring system like an aziridine, an azetidine or an epoxide ring, or whereby the reactive functional group is an alkoxysilane. Aziridine and azetidine rings react with carboxylic groups in polymer systems on an aqueous basis. Epoxide rings react with amino functions which may be present in water-borne polymer systems. Alkoxysilane functions give, after hydrolysis, a condensation reaction with silane functions which may be present in polymers on an aqueous basis.

by self-condensation reactions. Specific examples hereof in the present invention are compounds of the formulas (1), (2), (3) and (4), whereby the reactive functional groups are alkoxysilanes. While the carbodiimide functions react with the carboxylic groups in the polymer systems on an aqueous basis, the alkoxysilane functions from the same molecule will react, after hydrolysis, with the alkoxysilane functions from neighboring molecules. This gives rise to a network of Si—O—Si bondings throughout the crosslinked polymer system and makes the products to excellently applicable crosslinkers.

by self-addition reactions. Specific examples hereof in the present invention are compounds of the formulas (1), (2), (3) and (4), whereby the reactive functional group is an aziridine ring. With the reactions with the aziridine ring there is a competition between an addition to the carboxylic group in the water-borne polymers and a self-addition. Through this a network of coupled ethyleneamine functions may arise, although this is less tight than in the above-mentioned alkoxysilane compounds.

The possibility to form a network of coupled crosslinking molecules both with the alkoxysilane function as with the aziridine ring is the most important cause that an increased crosslinking capacity is observed in respect to polycarbodiimide crosslinkers. Another cause of an increased crosslinking capacity is that with one and the same molecular weight more functional groups are present in total.

DETAILED DESCRIPTION OF THE INVENTION

In the following description the carbodiimide functions and the other reactive functional groups $F^1$ and/or $F^2$ which are present in the composition of the present invention will be referred to collectively as "the functional groups". The oligomeric compounds containing carbodiimide functions and other functional groups have the general formula (1), (2), (3), and 4.

The groups $R^1$, $R^2$, $R^3$ and $R^4$ are defined herein as being groups which have no reactivity towards the carbodiimide functions or the groups $F^1$ and $F^2$. However, the groups $R^1$, $R^2$, $R^3$ and $R^4$ can contain any substituent group which does not significantly interfere with the function of the carbodiimide functionalities and the groups $F^1$ and $F^2$ when the composition of the present invention is used as a crosslinking agent. Hence, the groups $R^1$, $R^2$, $R^3$ and $R^4$ may, for example, include alkyl or alkoxy side chains or may include a urethane grouping in the main chain. The groups $R^1$, $R^2$, $R^3$ and $R^4$ may be, or may include, aromatic groups and the terms "aromatic" and "aryl" are used herein to include fused aromatic rings and also substituted aromatic rings wherein the substituents are non-reactive groups of the type previously discussed herein. The non-reactive group $R^1$ is a terminating group of the carbodiimide functional oligomer and is typically a hydrocarbon group which is optionally substituted and which preferably contains not more than 25 carbon atoms and typically not more than 20 carbon atoms. The group $R^1$ contains at least one carbon atom and generally contains at least four carbon atoms. The group $R^i$ may be an alkyl, alkenyl, cycloalkyl, cycloalkenyl, or aryl function, or a mixture thereof, and is linked to a group $R^2$, $R^3$ or $R^5$ (if present) by a carbodiimide function. The group $R^1$ may be residue of a monoisocyanate, from which the isocyanate function contributes to the carbodiimide formation, and the group $R^1$ may then be a hydrocarbon group or a substituted hydrocarbon group. Alternatively, the group $R^1$ may be derived from the residue of a diisocyanate in which one of the isocyanate functions is capped by an amino or hydroxy compound and the second isocyanate contributes to the carbodiimide formation, and the group $R^1$ is then a substituted hydrocarbon group in which the, or a, substituent group is a group —NH(C=O)$R^6$ in which $R^6$ is —O$R^7$ or NH$R^7$, and $R^7$ is a hydrocarbyl group, for example an alkyl group containing up to ten, especially up to six carbon atoms, such as a propyl group. The group $R^7$ may also be a hydrophilic segment containing a polyalkoxy group in which particularly ethoxy functions are present.

The number of alkoxy functions varies, so that the molecular weight of the hydrophilic segment lies between 100 and 10000, preferably between 500 and 2500 and particularly between 1100 and 1800. The hydrophilic segment may also contain an acidic residue as a sulphonic acid salt.

The group $R^2$ is a divalent, non-reactive organic group, and particularly is a divalent hydrocarbon group which can be an alkylene, alkenylene, cycloalkylene, cycloalkenylene or arylene group or a mixture of these and typically is the hydrocarbon residue from a diisocyanate used to form the carbodiimide bonds.

In the carbodiimide functional oligomer or polymer the group $R^3$ is a divalent group containing a hydrophilic segment and improves the dispersibility of the product in water or aqueous polymer dispersions, emulsions or solutions. The hydrophilic segment is typically a poly(oxyalkylene) group, especially a poly(oxyethylene) group. The group $R^3$ can be a residue of an addition product of two isocyanate containing materials with a poly(oxyalkylene)-diol, a poly(oxyalkylene)-diamine, a diol or diamine with a poly(oxyalkylene) side chain, or a diol or diamine with a poly(oxyalkylene) side chain containing a sulphonic salt residue. In general at least one of the isocyanate containing materials, and typically both, is a diisocyanate. The terminal NCO group, or groups, of the addition product which forms the group $R^3$ contribute to the formation of the carbodiimide functions in the system. The group $R^3$ contains hydrophilic segments which are typically oxyalkylene, and especially oxyethylene, groups. The hydrophilic segments are generally poly(oxyalkylene) groups and the number of oxyalkylene groups is sufficient for the group $R^3$ to have a molecular weight of at least 200. If the group $R^3$ has a high molecular weight this will have an adverse effect on the viscosity of the product and the proportion of the functional groups present in the final composition. Hence, it is preferred that the molecular weight of the group $R^3$ does not exceed 10,000 and generally the molecular weight does not exceed 5000. Useful products have been obtained in which the molecular weight, of the group $R^3$ is at least 500 and does not exceed 2500, particularly from 1000 to 1800. It will be appreciated that the molecular weight of $R^3$ is an average molecular weight. The group $R^3$ is typically derived from a poly(oxyalkylene) diol or diamine in which the poly(oxyalkylene) group may be the main chain or a side chain and the average molecular weight can be deduced by determining the number of reactive hydrogen atoms in the compound, for example the —OH number measured as mg of KOH/g of a diol containing the group $R^3$.

The group $R^4$ forms a link between the carbodiimide functional oligomer and the reactive functional group which is other than a carbodiimide functional group. Typically the group $R^4$ contains a hydrocarbon residue and a urethane function (—NH(C=O)O—) and may also include a further hydrocarbon residue. The group $R^4$ is the residue of an aliphatic, cycloaliphatic or aromatic diisocyanate of which one isocyanate group contributes to the formation of a carbodiimide function. The second isocyanate group forms an addition product with an isocyanate reactive group which is connected to, or which forms a part of, the reactive functional group which is other than a carbodiimide functional group. The isocyanate reactive group may be a hydroxy or amino group which is connected to the reactive functional group which is other than a carbodiimide functional group either directly or through an optionally substituted hydrocarbon group such as an alkyl, cycloalkyl or aryl group. Alternatively the isocyanate reactive group may be a part of the other reactive functional group for example as in an thiozalidine ring.

The group $R^5$ forms a link between the carbodiimide functional oligomer and the group $F^2$. The group $R^5$ may be the residue of an addition product of two aliphatic, cycloaliphatic or aromatic diisocyanates and a dihydroxy, a diamino, or a amino-hydroxy compound with a reactive functional group in the chain or in the side chain. Alternatively, the group $R^5$ may be derived from a compound containing more than two hydroxy and/or amino groups, for example trimethylolpropane, with isocyanate containing materials and/or compounds containing a reactive functional group other than a carbodiimide functional group. The NCO functions of the addition product which forms $R^5$ contribute to the formation of the carbodiimide functions in the final composition.

The groups $R^2$, $R^4$ are divalent groups and typically include a hydrocarbon group optionally with substituent groups which are non-reactive. Any hydrocarbon group present in $R^2$, $R^4$ preferably contains not more than 25 carbon atoms and typically not more than 20 carbon atoms. These groups typically contain a hydrocarbon group having at least one carbon atom and generally at least six carbon atoms. The groups may be derived from alkyl, alkenyl, cycloalkyl, cycloalkenyl or aryl groups or mixtures thereof and are linked to carbodiimide functions or may be linked to a carbodiimide function and a reactive functional group which is other than a carbodiimide functional group.

The group Q may be a group —$R^2$ or a group —$R^4$—$F^1$ or may be a residue of an organic compound adapted to function as a site for branching. When the group Q is a residue of an organic compound adapted to function as a site for branching it may be the residue of a polyisocyanate, from which the NCO groups contribute to the formation of the carbodiimide functions in the system or it can be the residue of an adduct of di-or polyisocyanates with a diol, polyol, diamine, polyamine or amino-hydroxy compound, from which the remaining NCO groups contribute to the carbodiimide formation. The group Q may additionally contain a reactive functional group which is other than a carbodiimide functional group and may contain more than one of such reactive groups.

$F^1$ and $F^2$ are, or include, a reactive functional group which is other than a carbodiimide functional group and may contain a mixture of different reactive functional groups. The reactive functional group can be any functional group with reactivity towards functional groups in an aqueous polymer dispersion, emulsion, or solution, or towards corresponding groups (for instance by self-condensation of self-addition). The reactive functional group can be halogen; alkenyl; arylalkene; alkynyl; arylalkyne; alkadiene; aldehyde; dialkylacetal; dithioacetal; ketone; unsaturated aldehyde; ketone or carboxylic ester; nitrile; imine; alkylalkoxy silane; alkoxysilane; anhydride; mixed anhydride; oxime-protected diisocyanate; diketone; ketoester; thioketoester; ketothioester; thioketothioester; or a mixture containing two or more such reactive functional groups. The group $F^1$ and/or $F^2$ can be a reactive functional group which is, or contains, a reactive ring system. The reactive ring system can be any ring that opens at electrophilic or nucleophilic attack. The reactive ring system can be any three, four, five, six, seven or eight membered ring containing one or more nitrogen and/or oxygen and/or sulphur atoms and/or keto and/or thioketo functions. As examples of a reactive ring system there may be mentioned aziridine, epoxide, thiirane, azirine, oxirene, thiirene, azetidine, oxetane, thietane, beta-lactam, beta-lactone, thiethanone, furan, pyrroline, dihydrofuran, dihydrothiophene, pyrrolidine, tetrahydrofuran, tetrahydrothiophene, oxazolidine, dioxolane, oxathiolane, thiazolidine, imidazoline, dithiolane, pyrazolidine, pyrazoline, oxazoline, thiazoline, imidazoline, dioxole, oxazolone, pyrrolidone, butyrolactone, thiobutyrolactone, butyrothiolactone, thiobutyrothiolactone, oxazolidone, dioxolane-2-one, thiazolidinone, dihydropyridine, tetrahydropyridine, pyran, dihydropyran, tetrahydropyran, succinic anhydride, succinimide, thiopyran, dihydrothiopyran, tetrahydrothiopyran, dihydropyrimidine, tetrahydropyrimidine, hexahydropyrimidine, dioxane, morpholine, thiamorpholine, dithiane and triazine.

The value of k and l and of n and p, determines the length of the oligomer chains. The value of k and n may be the same or different and is for straight chain systems from 1 up to 10, preferably from 1 to 4. For branched systems the values are from 0 up to 10, preferably 0 up to 4.

The value of l and p may be the same or different and is from 0 up to 4, and preferred values are from 0.01 to 2 and especially at least 0.1 and not more than 0.8. The value of m and o may be the same or different and is from zero up to 5 with preferred values of from zero up to 1. The values of q, r and s are from 1 up to 6 and preferably from 1 to 3. The value of y is at least one and may be up to 10 with preferred values of one up to four. The value of x may be zero or may be up to 10, with preferred values of zero up to two and especially of zero or one.

When the value of l and p together is less than (x+y), not all of the oligomer or polymer chains contain hydrophilic segments. However, the hydrophilic segments are typically poly(oxyalkylene) groups and hence the composition generally contains zero to 30% by weight of the hydrophilic segments, preferably more than 2% and especially 10 to 20% by weight of the hydrophlic segments.

The present invention also provides the process for preparing the oligomeric compounds according to the formulas (1), (2), (3) and (4). In this process a reaction takes place between diisocyanates, possibly monoisocyanates, possibly polyisocyanates, hydrophilic diols and/or diamines and/or hydroxylamines, possibly polyols and/or polyamines and/or polyhydroxylamines. Under influence of a catalyst carbodiimides are formed and the reaction is stopped at the moment that a desired NCO% by weight has been reached in the reaction medium and thereafter the remaining NCO groups react with a product containing at least one reactive proton and a reactive functional group which is other than a carbodiimide functional group.

In the first stage of the process, diisocyanates, optionally together with monoisocyanates, hydrophilic diols or diamines, and, in the case that branched polycarbodiimides are required, polyisocyanates of adducts containing isocyanate groups or precursors of such adducts, together in the presence of a catalyst to form carbodiimide functional groups with the evolution of carbon dioxide while the hydrogen active compounds are embodied in the oligomer system. As a catalyst for this reaction, phospholenes, phospholene oxides, or oxidized phospholene sulphides can be used. A convenient catalyst is 2,5-dihydro-3-methyl-1-phenylphosphol-1-oxide. The reaction temperature can vary from 60° C. to 180° C. Using aliphatic or cycloaliphatic isocyanates, a temperature from 120° C. to 160° C. is preferred, and using aromatic isocyanates the preferred reaction temperature is from 80° C. to 120° C. Heating is continued until a desired NCO% by weight has been reached in the reaction medium. The final NCO% by weight determines the chain length of the oligomer. After cooling down, the additional reactive functional group is introduced by reaction of the remaining NCO groups with a product containing at least one reactive proton and the additional reactive functional group concerned or with a product which includes a reactive functional group containing a reactive proton. The reactive proton is preferably present in a hydroxy or amino group. The reaction between the residual NCO groups and the product containing a reactive proton and an additional reactive functional group is effected at a temperature which is lower than that used for the formation of the carbodiimide groups. If the reactive proton is present in a hydroxy group, a reaction temperature of at least 30° C. is typically used and temperatures of up to 100° C., for example 80° C., may be preferred. If the reactive proton is present in an amino group, reaction can be effected at about ambient temperature, for example from 15° C. to 30° C.

If a monoisocyanate is used, this will form a product containing a group $R^1$, for example a composition of the general formulas (1)–(4). The monoisocyanate may be any monoisocyanate which is free from functional groups which can react with the carbodiimide functional groups and the other reactive functional groups which are present in the product, and such monoisocyanates include, for example, butylisocyanate, octylisocyanate and phenylisocyanate.

Alternatively, the monoisocyanate may be obtained in a preliminary stage by reaction of a diisocyanate with a compound having a reactive hydrogen atom, such as an amine or particularly an alkanol. The diisocyanate is conveniently, but not necessarily, the same diisocyanate as is to be used to form the carbodiimide functional groups, while the compound containing the single reactive proton preferably contains not more than ten carbon atoms, and especially not more than six carbon atoms, for example methanol, ethanol, propanol, butanol, pentanol, hexanol and the like. The reaction of an isocyanate containing compound with a compound containing a reactive proton, either in the optional preliminary stage or in the final stage, may be effected in the presence of a catalyst which is typically a metal-carboxylic acid salt, for example a tin salt such as tin octoate or dibutyl tin dodecanoate. If the reactive proton is present in an amino group, the use of a catalyst is generally not necessary.

The diisocyanates used in the process of the present invention can be saturated aliphatic diisocyanates, cycloaliphatic diisocyanates or aromatic diisocyanates, and in particular contain hydrocarbon groups having up to 20 carbon atoms, especially up to 15 carbon atoms. As examples of suitable diisocyanates there may be mentioned 2,4-toluene diisocyanate, 2,6-toluene diisocyanate and mixtures thereof, dicyclohexylmethane-4,4'-diisocyanate; 3-isocyanatomethyl-3,5,5-trimethylcyclohexylisocyanate; and 1,6-diisocyanatohexane.

The hydrophilic diol or diamine provides the hydrophilic segments in the composition of the present invention and the hydrophilic segments, which typically incorporate poly(oxyethylene) chains, may be in the main chain of the diol or diamine or may be in the side chain of the diol or diamine. As noted previously herein, the compound may contain a poly(oxyalkylene) side chain containing an acid residue, for example a salt of a sulphonic acid. The hydrophilic diol or diamine reacts with isocyanate groups to form a linkage of the type —NH(C=O)O— or —NH(C=O)NH— between the hydrophilic group and, for example, a residue of a diisocyanate compound. Conveniently a hydrophilic diol is used. Particularly suitable hydrophilic diols include poly(oxyethylene) glycol having a molecular weight from 100 to 10000, preferably from 500 to 2500 and particularly between 1100 and 1800. Compounds having a poly(oxyalkylene) side chain include 2-(hydroxymethyl)-2-[(oxyalkylated)hydroxymethyl)]-butan-1-ol, wherein the oxyalkylated group may be a poly(oxyethylene) group or a poly(oxyethylene)-poly(oxypropylene) block copolymer group, either of which may contain an acid residue, in particular a sodium sulphonate residue.

If the composition is to be a branched material, the reaction mixture also contains an polyisocyanate compound, which term is used to mean an isocyanate compound containing at least three isocyanate groups. Alternatively, the reaction mixture may contain a preformed adduct of a polyisocyanate which is the product of a reaction between a mixture of di- or polyisocyanates and diols, diamines, hydroxylamines, polyhydroxylamines polyols or polyamines. As a yet further alternative the reaction mixture may include a compound containing at least three reactive protons, for example a polyol, polyamine or polyhydroxyamine, suitable compounds of this type being trimethylolpropane and erythritol. Polyamines include diethylene triamine, triethylene tetramine and tetraethylene pentaamine, and the polyamines should be added after the carbodiimide formation, and at ambient temperature, to avoid the formation of tar or yellow colouring of the reaction mixture.

The reaction to form carbodiimide functional groups is continued until the proportion of residual (unreacted) isocyanate groups has fallen to less than 20% by weight of the reaction mixture. The proportion of isocyanate groups can be determined by titration, for example using an excess of a secondary amine and titrating excess amine against an acid. It will be appreciated that the proportion of residual isocyanate groups is dependent on the extent of reaction which has occurred, the lower the proportion of residual isocyanate groups the more reaction has occurred and the higher the degree of oligomerisation. In general the proportion of residual isocyanate groups does not exceed 12% by weight, and especially is not more than 8% by weight of the reaction mixture. If the proportion of residual isocyanate groups is reduced to a low level, the resulting product has an undesirably high molecular weight which results in a reduced water solubility and an increased viscosity of a solution of the product. Hence, it is preferred that the level of residual isocyanate groups does not fall below 1% by weight and it is generally preferred that the level of residual isocyanate groups does not fall appreciably below 2% by weight of the reaction mixture. When the proportion of residual isocyanate groups has fallen to a desired level, the reaction mixture is cooled to terminate the formation, or substantially reduce the rate of formation, of the carbodiimide functional groups.

In the second stage of the process the reactive functional groups are introduced by reaction of the residual isocyanate groups in the oligomer with a compound containing at least one reactive proton. At least a part of this compound is, or contains, a reactive functional group as described in detail previously herein. A mixture of such compounds may be used to provide different functional groups.

The compound containing a reactive proton may be a reactive ring system provided such ring contains an active proton, for example as in 2-methylaziridine, 4,4-dimethyloxazolidine, thiazolidine and the like. The reactive proton may be present in an amino hydroxyl compound which is connected to the reactive functional group or reactive ring system optionally by an alkyl, cycloalkyl or aryl group, for example as in 1-(2-hydroxyethyl)-ethyleneim, glycidol, N-cyclohexyl-3-hydroxy-azetidine, 2-ethyl-3-hydroxyethyl-2-methyloxazolidine, 4-ethyl-4-hydroxymethyloxazoline, allyl alcohol, methylethylketone oxime, 1-amino-3-(triethoxysilyl)-propane, 1-amino-3-(trimethoxysilyl)-propane. Moreover it is possible that the reactive proton is present in a hydroxyl compound or an amino compound which is optionally coupled via alkyl, cycloalkyl or aryl groups to more than one reactive functional group. An example thereof is di(3-trimethoxysilylpropyl)-amine. Also compounds with two or more reactive protons may be added in the second stage of the process in order to incorporate a group $R^5$—$F^2$ in the compound. An example thereof is N-(3-trimethoxysilylpropyl)-1,2-diaminoethane.

In the second stage of the reaction $R^1$ may be introduced by reaction of part of the residual isocyanate functions with a product containing at least a reactive proton, like a hydroxyl compound or an amine. Examples are methanol, propanol, butanol, dibutylamine, dimethylaminoethanol, polyalkoxyamine.

The reaction between the residual isocyanate functions and hydroxyl compounds may be catalyzed for instance by a carboxylic metal salt, by way of example a tin salt as tin octoate or dibutyltin dodecanoate.

Depending on the presence and the proportion in the reaction mixture of the above-mentioned component types compounds are obtained of formula (1), (2), (3) or (4) or may be a mixture of products.

The total reaction process is executed under inert conditions in view of the high reactivity of part of the reaction components and the high temperatures involved in the first part of the reaction proces. The reaction process is therefore preferably executed in an inert atmosphere, so as for instance under nitrogen, helium or argon gas.

The process of the present invention may be executed both with and without a solvent or solvent system. It is also possible to carry out the first stage of the process without a solvent and to add the solvents after the carbodiimide formation. This solvent or solvent system may not be reactive towards the carbodiimide functions or towards the reactive functional groups. If the solvent or the solvent system is used already in, the first stage of the process it should have a relatively high boiling point or boiling range because of the high temperatures, for instance above 120° C. When it is added after the carbodiimide formation the boiling point or boiling range may be lower. The compounds of the present invention are pre-eminently made to be used in aqueous polymer systems and hence it is preferred that the solvent or solvent system is miscible or at least partially miscible with water. Examples of suitable solvents are: methylacetate, ethylacetate, N-methyl-pyrrolidone, dimethylformamide, methoxypropylacetate, ethoxypropylacetate, methoxybutylacetate, ethoxybutylacetate, diglycoldimethylether, diglycoldiethylether, methylglycolacetate, ethylglycolacetate, butylglycolacetate, acetone, methylethyl ketone, methylisobutyl ketone, propylene carbonate and related solvents.

The compositions of the present invention, which contain carbodiimide functionalities, hydrophilic segments and reactive functional groups and/or reactive ring systems, can be used as low-temperature baking crosslinking agents for systems containing carboxylic groups such as aqueous dispersions, emulsions or solutions of polymers containing a carboxylic group, including polyurethanes, polyacrylates and polymethacrylates.

The combination of carbodiimides and one or more types of a reactive functional group in a compound according to formula (1), (2), (3) and (4) cause an increased crosslinking capacity with respect to the polycarbodiimide crosslinkers. Both the carbodiimide functions and the reactive functional groups contribute to the crosslinking as described hereinabove.

In the composition of the present invention, the presence of hydrophilic segments and also the presence of polar hetero atoms inthe reactive functional groups increases the dispersibility of the systems with water or with aqueous polymer dispersions, emulsions or solutions If the compounds according to formula (1), (2), (3) or (4,) are applied as crosslinker, the reactive functional groups should be able to react with functional groups from the polymer system or with each other, before a major part is hydrolysed. However, in a number of cases a reaction takes place of the functional group with water preceding the crosslinking. Examples or such functional groups are nitriles, dialkylacetals, dithioalkylacetals, alkoxysilanes and alkyl-alkoxysilanes. Convenient reactive functional groups are the aziridine or epoxide rings, or the alkoxysilane or alkyl-alkoxysilane functions. The presence of aziridines as reactive ring systems gives, in combination with the carbodiimide functionalities, an improved effect when used for crosslinking in carboxylic group containing aqueous polymer systems as already described, this is caused by the formation of a network of ethylene-amine functions through the crosslinked system andmoreover by the fact that at a comparable molecular weight more reactive functions are present. The alkoxysilane-containing products are their low toxicity and non-mutagenicity. The products, with a chemical composition of formulae (1), (2), (3) or (4) with alkoxysilane functions for crosslinking application are even better than with aziridine containing products. On application of the oligomer as a crosslinker the carbodiimides react with the carboxylic groups in the aqueous polymers, while the alkoxysilane functions of the same molecule are first hydrolysed, after which a condensation reaction of the formed silanols gives rise to Si—O—Si bonds created with neighbouring molecules.

The procedure for applying the crosslinking agents according to the present invention is very simple. The oligomeric compounds according to formulae (1), (2), (3) and (4) with as functional groups aziridines epoxides, azetidines or alkoxysilanes, for crosslinking application are properly dispersible in water or in dispersions, emulsions or solutions of polymers containing carboxylic groups.

The concentration of the composition of the present invention when used as a crosslinker is not narrowly critical. Suitable concentrations are between 0.5 and 30%, preferably between 2 and 15%, by weight.

In most cases, specially in using low molecular weight products, the crosslinkers can be stirred in by hand in water or aqueous polymer solutions, dispersions or emulsions, without the use of supplemental surfactants. However, the presence of supplemental surfactants, or of solvents for the emulsification of other additives, will cause no problem, provided there is no interference with the functional groups which are present in the composition.

Many additional ingredients may also be present at the crosslinking stage, for example fillers, colorants, pigments, silicones and the like. These additional ingredients can be used in combination with the compositions of the present invention when there is no or little interference with the crosslinking function, or, if there is interference, it contributes to an optimal application result. The compositions of the present invention can also be used to effect cross-linking of solutions, in non-aqueous solvents, of polymers which contain carboxylic groups and, in such systems, crosslinking generally occurs more quickly than in an aqueous system.

Solutions, dispersions or emulsions of polymers including the compositions of the present invention as crosslinking agents can be formed into a film by casting the liquid medium onto a substrate and allowing the liquid solvent or suspending medium to evaporate whilst the polymer undergoes crosslinking. In this manner coatings can be applied to substrates such as leather and artificial leather.

The crosslinking agent of the invention may be used in adhesives, sealants, printing ink and in coatings. Furthermore the crosslinked polymers may be used on the following substrates: metal (especially steel and aluminium), wood, plastics (especially polyethylene, polypropylene, polyester), paper board and the already mentioned leather.

In a formulation to be applied may be taken up besides the crosslinking agents of the invention and the polymer dispersion, emulsion or solution to be applied, also without any problem other components, like binding agents, colorants, pigments or silicones. Condition is, however, that they do not influence the crosslinking, or if they do, that an optimal result can be obtained.

Various aspects of the present invention are illustrated by the following examples. In all examples wherein oligomeric compounds according to the formulae (1), (2), (3) and (4) were prepared, nitrogen gas was conducted over the reaction mixture during the reaction process. These examples are only illustrative of the invention and are not limiting of the invention as claimed hereafter.

EXAMPLE 1

This example illustrates the preparation of a compound according to the general formula (4), which comprises carbodiimide functionalities and as a reactive functional group 2-methylaziridine.

Under a nitrogen atmosphere, 21.0 g (0.35 mole) of 1-propanol was added within 6 to 8 hours under stirring to 77.7 g (0.35 mole) of 3-isocyanatomethyl-3,5,5-trimethylcyclohexylisocyanate (obtainable from Huls as Isophoronediisocyanate, and in the following indicated as "IPDI") and 0.01 g of tinoctoate at 20°-25° C. After standing overnight 233.1 g (1.05 mole) of IPDI, 2.4 g of 2,5-dihydro-3-methyl-1-phenylphosphol-1-oxide (obtainable from Merck) and 122.4 g of diethyleneglycoldimethylether were added and the mixture was heated while stirring to 150° C. Stirring and heating was continued at 150° C. until an isocyanate content of 3.6–4% was reached in the reaction mixture. The reaction mixture was cooled to 20° C. After again determining the isocyanate content an equivalent amount of 2-methylaziridine was added while stirring and to the reaction mixture was finally given a solid content of 50% by adding extra diethyleneglycoldimethylether. The mixture was stirred for another 15 min at room temperature.

EXAMPLE 2

This example illustrates the preparation of a compound according to the general formula (3), comprising carbodiimide functions and as reactive functional groups two 2-methylaziridines.

A mixture of 222 g (1.00 mole) of IPDI and 2.4 g of 2,5-dihydro-3-methyl-1-phenylphosphol-1-oxide in 189 g methoxypropylacetate was heated while stirring to 150° C. The stirring and heating was continued at 150°

C. until an isocyanate content of 5.5–6% in the reaction mixture was reached. The reaction mixture was cooled to 20° C. After repeated determination of the isocyanate content an equivalent amount of 2-methyl-aziridine was added while stirring and the reaction mixture was finally given a solid content of 50% by addition of further methoxypropylacetate. The mixture was stirred another 15 min at room temperature.

EXAMPLE 3

This example illustrates the preparation of a compound according to the general formula (3), with two reactive groups, both being 2-methylaziridine.

The procedure of Example 2 was repeated, with the exception that no solvent was used and the reaction at 150° C. was continued until the isocyanate content amounted to 12–13% by weight.

EXAMPLE 4

This example illustrates the preparation of a compound according to the general formula (3) with four reactive functional groups, each being a trimethoxysilane group.

The procedure of Example 2 was repeated, with the exception that instead of propyleneimine an equivalent amount of di-(3-methoxysilylpropyl)-amine (obtainable from Union Carbide Corporation as Silane Y-9492), was used.

EXAMPLE 5

This example illustrates the preparation of a compound of the general formula (4), with carbodiimide functionalities, hydrophilic segments and, as a terminal functional group an aziridine ring.

Under a nitrogen atmosphere, 21.3 g (0.355 mole) of 1-propanol was added over a period of 6 to 8 hours to 78.7 g (0.355 mole) of 3-isocyanatomethyl-3,5,5-trimethylcyclohexylisocyanate (obtainable from Huls as Isophoronediisocyanate hereafter referred to as "IPDI") and 0.01 g of tinoctoate at 20°–25° C., while stirring. After standing overnight, 196.3 g (0.884 mole) of IPDI, 74.1 g (0.063 mole) of a 2-(hydroxymethyl)-2-[(oxyethylated)hydroxymethyl]-butan-1-ol having a molecular weight of about 1180 and obtainable from Th. Goldschmidt AG as Tegomer D3403 (hereafter referred to as "Tegomer D3403") and 2.4 g of 2,5-dihydro-3-methyl-1-phenylphosphol-1-oxide (obtainable from Merck) were added and the mixture was heated, with stirring, to 150° C. Heating at 150° C. and stirring was continued until the isocyanate amount was 6.5–7% by weight of the reaction mixture. 333 g of methoxypropylacetate was added and the mixture was cooled down to 80° C. After rechecking the isocyanate amount, an equivalent amount of 1-(2-hydroxyethyl)-ethyleneimine was added, followed by 0.075 g of dibutyl tindodecanoate and the mixture was adjusted to 50% solids by addition of further methoxypropylacetate. After stirring for one hour at 80° C., the mixture was cooled down. Analysis by glc showed a remaining amount of 1-(2-hydroxyethyl)-ethyleneimine of less than 50 ppm. In the infrared spectrum a small remaining isocyanate signal was observed, which disappeared within 7 days. The testing results of the crosslinking properties are presented in Examples 37 and 39 and the results of a reactivity test are presented in Example 8.

EXAMPLE 6

This example illustrates the preparation of a compound of general formula (4), according to Example 5.

The process of Example 5 was repeated with the exception that instead of methoxypropylacetate diethyleneglycoldimethylether was used. A comparable product relating to reactivity and stability was obtained.

EXAMPLE 7

This example illustrates the preparation of a product according to general formula (4) with carbodiimide functions and hydrophilic segments but without additional reactive functional groups or ring systems. This comparative product was prepared as comparison material in the testing of the products of Examples 5, 10, 11, 12, 18, 19, 29, 30, 31, 35 and 36.

The procedure was similar to that in Example 5, with the exception that 1-(2-hydroxyethyl)-ethyleneimine was substituted for dimethylethanolamine. The testing results of the crosslinking properties of the product are presented in the Examples 37, 38, 40 and 41 and those of a reactivity test in Example 8.

EXAMPLE 8

The reactivity of the products of Example 5 and 7 was evaluated.

The reactivity of the products of Example 5 and 7 and of an aziridine crosslinker, obtainable from ICI Resins B.V., as CX-100, was compared by following the reaction of the products with the carboxylic acid group in acetic acid.

The products of the Examples 5 and 7 and CX-100 (50 g) were mixed at 21° C. with a 70% solution of acetic acid in water (5 g) or with water (5 g). After 3 min the temperature of the mixtures was measured and the decrease of the carbodiimide functionality was followed by IR-spectroscopy. The results are set out in Table A.

TABLE A

| Crosslinker (a) | Add. (b) | Temp. after 3 min (°C.) | Relative carbodiimide concentration after | | | |
|---|---|---|---|---|---|---|
| | | | 5 min | 15 min | 30 min | 100 min |
| 5 | H$_2$O | 22 | 100 | 100 | 100 | 100 |
| 5 | HAc | 60 | 19 | 12 | 4 | 2 |
| 7 | H$_2$O | 22 | 100 | 100 | 100 | 100 |
| 7 | HAc | 32 | 30 | 18 | 7 | 2 |
| CX-100 | H$_2$O | 21 | | | | |
| CX-100 | HAc | 28 | | | | |
| Ex. 7 + CX-100 | H$_2$O | 22 | 100 | 100 | 100 | 100 |
| Ex. 7 + CX-100 | HAc | 40 | 28 | 16 | 7 | 2 |

Notes to Table A:
(a) 5 is the product of Example 5. 7 is the product of Example 7. CX-100 is the aziridine crosslinker CX-100. Ex. 7 + CX-100 is a mixture of 7 and CX-100 in equal proportions by weight.
(b) HAc is 70% by weight aqueous acetic acid.
(c) The carbodiimide decrease is followed by the decrease of the absorption signal to be determined in the IR-spectrum at 2140 cm-1. As 100% is the signal which corresponds with the same concentration of the product of Example 5 or 7 in the inert solvent methoxypropylacetate.

The results in Table A show that the presence of carbodiimide functionalities and aziridine functions in the same product (Example 5) causes an improved effect in the reactivity of this product as indicated by:

After the addition of acetic acid a higher temperature increase is obtained when both functionalities are present in one molecule, as compared to products with only one type of functionality or as compared to a mixture of an aziridine crosslinker (CX-100) and a polycarbodiimide cross-linker (Example 7).

The decrease in carbodiimide functionality occurs more rapidly when both functionalities are present in one molecule as compared to products with only one type of functionality or as compared to a mixture of an aziridine crosslinker (CX-100) and a polycarbodiimide crosslinker (Example 7).

EXAMPLE 9

This example illustrates the preparation of a composition of general formula (4) consisting of a chemical composition of carbodiimide functionalities, hydrophilic segments and, as a reactive functional group, an aziridine ring.

Under a nitrogen atmosphere, 21.3 g (0.355 mole) of 1-propanol was added over a period of 6-8 hours to 78.7 g (0.355 mole) of IPDI and 0.01 g of tinoctoate at 20°-25° C., while stirring. After standing overnight, 240.1 g (1.082 mole) of IPDI, 72 g (0.048 mole) of a poly(oxyethylene)-glycol having an average molecular weight (deduced from OH number) of about 1500 and obtainable from Hoechst as PEG-1500S, and 2.4 g of 2,5-dihydro-3-methyl-1-phenylphosphol-1-oxide was added and the mixture was heated with stirring to 150° C. Heating at 150° C. and stirring was continued until the isocyanate amount was 4.5-5% by weight of the reaction mixture. 376 g of methoxypropylacetate was added and the mixture was cooled down to 80° C. After rechecking the isocyanate amount 0.95 of an equivalent amount of 1-(2-hydroxyethyl)-ethyleneimine was added, followed by 0.075 g of dibutyl tindodecanoate and the mixture was adjusted to 50% solids by addition of further methoxypropylacetate. After stirring for 1 hour at 80° C. the mixture was cooled down. Analysis by glc showed a remaining amount of 1-(2-hydroxyethyl)-ethyleneimine of less than 50 ppm. In the infra-red spectrum a small remaining isocyanate signal was observed, which disappeared within 7 days.

EXAMPLE 10

This example illustrates the preparation of a composition of general formula (4) in which the reactive functional group is an epoxide ring.

The procedure of Example 5 was repeated with the exception that an equivalent amount of glycidol was substituted for 1-(2-hydroxyethyl)-ethyleneimine. The testing results of the crosslinking properties are presented in Example 37.

EXAMPLE 11

This example illustrates the preparation of a composition of general formula (4) in which the reactive functional group is 2-methylaziridine.

The procedure of Example 5 was repeated with the exception that an equivalent amount of 2-methylaziridine was substituted for 1-(2-hydroxyethyl)-ethyleneimine and the reaction with 2-methylaziridine was effected at 25°-30° C. The addition of tindodecanoate as catalyst was not necessary in order to effect the reaction with 2-methylaziridine. The testing results of the crosslinking properties are presented in Example 37.

EXAMPLE 12

This example illustrates the preparation of a composition of general formula (4) in which the reactive functional group is N-cyclohexylazetidine ring.

The procedure of Example 5 was repeated with the exception that an equivalent amount of N-cyclohexyl-3-hydroxyazetidine was substituted for 1-(2-hydroxyethyl)ethyleneimine. The testing results of the crosslinking properties are presented in Example 37.

EXAMPLE 13

This example illustrates the preparation of a composition of general formula (4) using as reactive functional groups an aziridine ring.

The procedure of Example 5 was repeated with the exception that, after the reaction of 1-propanol and IPDI, 233.7 g (0.892 mole) of dicyclohexylmethane-4,4'-diisocyanate was substituted for IPDI, while the used amount of Tegomer D3403 was 74.1 g (0.063 mole).

EXAMPLE 14

The example illustrates the preparation of a composition of general formula (4) in which the reactive functional group is 2-ethyl-2-methyloxazolidine.

The procedure of Example 5 was repeated with the exception that an equivalent amount of 2-ethyl-3-hydroxyethyl-2-methyloxazolidine was substituted for 1-(2-hydroxyethyl)-ethyleneimine.

EXAMPLE 15

This example illustrates the preparation of a composition of general formula (4) in which the reactive functional group is 4,4-dimethyloxazolidine.

The procedure of Example 5 was repeated with the exception that an equivalent amount of 4,4-dimethyloxazolidine was substituted for 1-(2-hydroxyethyl)-ethyleneimine and the addition of 4,4-dimethyloxazolidine was effected at 25°-30° C. without the addition of tindodecanoate as catalyst.

EXAMPLE 16

This example illustrates the preparation of a composition of general formula (4) in which the reactive functional group is 4-ethyloxazoline.

The procedure of Example 5 was repeated with the exception that an equivalent amount of 4-ethyl-4-hydroxymethyloxazoline was substituted for 1-(2-hydroxyethyl)ethyleneimine.

EXAMPLE 17

This example illustrates the preparation of a composition of general formula (4) in which the reactive functional group is a thiazolidine ring.

The procedure of Example 5 was repeated with the exception that an equivalent amount of thiazolidine was substituted for 1-(2-hydroxyethyl)-ethyleneimine and the addition of the thiazolidine was effected at 25°-30° C. without the addition of tindodecanoate as catalyst.

EXAMPLE 18

This example illustrates the preparation of a composition of general formula (3) having two reactive functional groups, both of which are aziridine rings.

A mixture of 222 g (1.00 mole) of IPDI, 81.4 g (0.069 mole) of Tegomer D3404, 1.8 g of 2,5-dihydro-3-methyl-1-phenylphosphol-1-oxide in 260 g of methoxypropylacetate was heated to 150° C. while stirring. Heating and stirring were continued until the isocyanate amount was 3.5-4% by weight of the reaction mixture and the mixture was cooled down to 80° C. After rechecking the isocyanate amount, 95% of an equimolar amount of 1-(2-hydroxyethyl)-ethyleneimine was added followed by 0.075 g of dibutyl tindodecanoate and the mixture was adjusted to 50% solids by the addition of methoxypropylacetate. After stirring for 1 hour at 80° C. the mixture was cooled down. Analysis by glc showed a remaining amount of 1-(2-hydroxyethyl)-ethyleneimine of less than 50 ppm. In the infra-red spectrum a small remaining isocyanate signal was observed which disappeared within 7 days. The testing results of the crosslinking properties are presented in Example 37.

EXAMPLE 19

This example illustrates the preparation of a composition which is a long chain modification of the product of Example 18.

The procedure was similar to that described in Example 18 with the exception that the carbodiimide formation was continued until the isocyanate amount was 1.8–2.2% by weight of the reaction mixture. The testing results of the crosslinking properties are presented in Example 37.

EXAMPLE 20

This example illustrates the preparation of a composition of general formula (3) having two reactive functional groups, both of which are methylaziridines.

The procedure of Example 18 was repeated with the exception that an equivalent amount of 2-methylaziridine was substituted for 1-(2-hydroxyethyl)-ethyleneimine and the addition of the ring system was effected at 25°–30° C. without the addition of tin dodecanoate as catalyst.

EXAMPLE 21

This example illustrates the preparation of a composition of general formula (3) having two reactive functional groups, both of which are allyl functions.

The procedure of Example 18 was repeated with the exception that an equivalent amount of allyl alcohol was substituted for 1-(2-hydroxyethyl)-ethyleneimine.

EXAMPLE 22

This example illustrates the preparation of a composition of general formula (3) having two ketoxime-protected isocyanate functions.

The procedure of Example 18 was repeated with the exception that an equivalent amount of methylethylketone oxime was substituted for 1-(2-hydroxyethyl)-ethyleneimine. The methylethylketone oxime was added at 20° C., after which stirring was continued for another hour at 55°–60° C.

EXAMPLE 23

This example illustrates the preparation of a composition of general formula (3) having two reactive functional groups, both of which are triethoxysilane functions.

The procedure of Example 18 was repeated with the exception that..an equivalent amount of 1-amino-3-(triethoxysilylpropyl)-amine (obtainable from Union Carbide Corporation as Silane A-1100) was substituted for the 1-(2-hydroxyethyl)ethyleneimine. The reaction with Silane A-1100 was effected without addition of the catalyst dibutyl tinoctoate at 25°–30° C.

EXAMPLE 24

This example illustrates the preparation of a composition of general formula (3) having two trimethoxysilane functions.

The procedure of Example 23 was repeated with the exception than an equivalent amount of 1-amino-3-(trimethoxysilyl)-propane (obtainable from Union Carbide Corporation as Silane A-1110 and hereafter referred to as "Silane A-1110") was substituted for Silane A-1110.

EXAMPLE 25

This example illustrates the preparation of a composition of general formula (3) having two reactive functional.groups, each of which contains two trimethoxysilane functions.

The procedure of Example 23 was repeated with the exception that an equivalent amount of di-(3-trimethoxysilylpropyl)-amine (obtainable from Union Carbide Corporation as Silane Y-9492) was substituted for the 1-amino-3-(triethoxysilyl)-propane.

EXAMPLE 26

This example illustrates the preparation of a composition of general formula (3) wherein there are two reactive functional groups which are a mixture of triethoxysilane and trimethoxysilane functions.

The procedure of Example 23 was repeated with the exception that a half equivalent of Silane A-1100 and a half equivalent of Silane A-1110 were substituted for an equivalent amount of Silane A-1100.

EXAMPLE 27

This example illustrates the preparation of a branched product of general formula (1) in which the group $R^5-R^2$ is originated from a diamine substituted with a trimethoxysilylpropyl group and having trimethoxysilane functions as terminal groups.

The procedure of Example 18 was repeated with the exception that the carbodiimide formation was continued until an isocyanate amount of 5.5–6% of the initial amount and the equimolar amount of 1-(2-hydroxyethyl)-ethyleneimine was replaced by a half equimolar amount of N-(3-trimethoxysilylpropyl)-1,2-diaminoethane (obtainable from Union Carbide Corporation as Silane A-1120, and hereafter referred to as "Silane A-1120") plus a half equimolar amount of Silane A-1110 and the addition of the Silanes was effected without addition of catalyst dibutyl tinoctoate at 25°–30° C.

EXAMPLE 28

This example illustrates the preparation of a composition of general formula (3) containing sulphonate terminated poly(oxyalkylated) side chains and two reactive functional groups, both of which are aziridine rings.

The procedure of Example 18 was repeated with the exception that the Tegomer D3403 was replaced by an equimolar amount of 2-hydroxymethyl-2-(sodium sulphonate terminated oxyalkylated [EO/PO weight ratio 85/15]-hydroxymethyl-butan-1-ol having a molecular weight of about 1340 and obtainable as Tegomer DS-3117 from Th. Goldschmidt AG and hereafter referred to as "Tegomer DS-3117".

EXAMPLE 29

This example illustrates the preparation of a composition of general formula (3) containing sulphonate terminated poly(oxyalkylated) side chains and two reactive functional groups, both of which are trimethoxysilane functions.

The procedure of Example 24 was repeated with the exception that the Tegomer D3403 was replaced by an equimolar amount of Tegomer DS-3117.

The testing results of the crosslinking properties are presented in Example 38.

EXAMPLE 30

This example illustrates the preparation of a compound according to the general formula (3) comprising carbodiimide functions and hydrophilic segments consisting of poly-alkoxylated side chains terminated by a sulphonic acid salt group, and four functional groups, each of which is a trimethoxysilane function.

The procedure of Example 25 was repeated with the exception that in this case the Tegomer D3403 was replaced by an equivalent amount of Tegomer DS-3117.

The testing results of the crosslinking properties of the product are presented in Examples 38, 40 and 41.

EXAMPLE 31

This example illustrates the preparation of a compound according to the general formula (3) comprising carbodiimide functions and hydrophilic segments consisting of poly-alkoxylated side chains terminated by a sulphonic acid salt group, and as reactive functional groups two triethoxysilane functions.

The procedure of Example 23 was repeated with the exception that the Tegomer D3403 was replaced by an equivalent amount of Tegomer DS-3117.

The testing results of the crosslinking properties of the product are presented in Example 40.

EXAMPLE 32

This example illustrates the preparation of a composition of general formula (3) containing aromatic groups and having two reactive functional groups, both of which are 2-methylaziridine rings.

18.6 g (0.3 mole) of ethanediol was added while stirring within an hour to 174 g (1.0 mole) of a commercial mixture of 2,4- and 2,6-toluene diisocyanate (obtainable from American Cyanamid) in 293 g of methoxypropylacetate, maintaining the temperature below 40° C. After stirring for 15 min, 118 g (0.1 mole) of Tegomer D3403 was added and the temperature was raised to 90° C. After 1.5 hour stirring at 90° C., 0.3 g of 2,5-dihydro-3-methyl-1-phenylphosphol-1-oxide was added and $CO_2$ evolution started. Heating and stirring at 90° C. was continued until the isocyanate amount was 2.8-3.2% by weight of the reaction mixture. 146 g of dimethylformamide was added and the mixture was cooled down to 20° C. After rechecking the isocyanate content, an equivalent amount of 2-methylaziridine was added. Stirring was continued for 15 min. In the infrared spectrum a small remaining isocyanate signal was observed which disappeared within 7 days.

EXAMPLE 33

This example illustrates the preparation of a branched product of general formula (1) having aziridine rings as the reactive functional groups.

A mixture of 13.4 g (0.1 mole) of trimethylolpropane, 144.3 g (0.65 mole) of IPDI and 59 g (0.05 mole) of Tegomer D3403 in 300 g of methoxypropylacetate was heated, with stirring, at 90° C. for one hour. 1.2 g of 2,5-dihydro-3-methyl-1-phenylphosphol-1-oxide was added and the temperature was raised to 150° C. Heating and stirring were continued at 150° C. until the isocyanate amount was 2.0-2.2 in the reaction mixture. The mixture was cooled down to 80° C. After rechecking the isocyanate amount, 95% of an equivalent amount of 1-(2-hydroxyethyl)-ethyleneimine was added followed by 0.075 g of dibutyl tindodecanoate and the mixture was adjusted to 30% solids by the addition of a further quantity of methoxypropylacetate. After stirring for one hour at 80° C. the mixture was cooled down. Analysis by glc showed a remaining amount of 1-(2-hydroxyethyl)-ethyleneimine of less than 50 ppm. In the infra-red spectrum a small remaining isocyanate signal was observed, which disappeared within 7 days.

EXAMPLE 34

This example illustrates the preparation of a composition of the general formula (i) in which the branching is essentially as in the product of Example 33, the group Q is as in the product of Example 27 and having as terminal groups ($-R^4-F^1_s$) groups containing trimethoxysilane functions.

A mixture of 4 g (0.03 mole) of trimethylolpropane, 122.1 g (0.55 mole) of IPDI and 66.7 g (0.05 mole) of Tegomer D-3117 in 157 g of methoxypropylacetate were heated, with stirring, to a temperature of 90° C. Stirring was continued for one hour and the temperature was raised to 150° C. 1.2 g of 2,5-dihydro-3-methyl-1-phenylphosphol-1-oxide was added and heating was continued at 150° C. until the isocyanate amount was 3.6% by weight of the reaction mixture. The mixture was cooled down to 20° C. After rechecking the isocyanate amount, a half equimolar amount of Silane A-1120 plus a half equimolar amount of Silane A-1110 were added. The reaction mixture was adjusted to a solid content of 30% by addition of a further amount of methoxypropylacetate. Stirring was continued for half an hour.

EXAMPLE 35

This example illustrates the preparation of a compound without carbodiimide functions and with trimethoxysilane functions as terminal groups. This product is made for comparison in testing the products of Example 30 and 31 in Example 40.

A mixture of 199.8 g (0.9 mole) of IPDI, 40.2 g (0.3 mole) of dimethylolpropionic acid and 200 g (0.2 mole) of polypropoxydiol with an average molecular weight of 1000 and obtainable from Voranol as PPG-1025, in 110 g of methoxypropylacetate was heated while stirring at 100° C. for 2 hours. The mixture was cooled down to 20° C. and after determination of the isocyanate amount an equivalent amount of Silane Y-9492 was added at 20° C. The reaction mixture was adjusted to a final solid content of 50% by adding a further amount of methoxypropylacetate. Stirring of the reaction mixture was continued for 30 min.

The obtained product has the same average molecular weight as the product from Example 30 and also the same trimethoxysilane concentration. The testing results of the crosslinking properties are presented in Example 40.

EXAMPLE 36

This example illustrates the preparation of a compound without carbodiimide functions and with terminal triethoxysilane functions. This product is made for comparative purposes for testing the products of Example 30 and 31 in Example 40.

The procedure of Example 35 was repeated with the exception that in this case the Silane Y-9492 was replaced by an equivalent amount of Silane A-1100.

The obtained product has the same average molecular weight as the product of Example 31 and also the same triethoxysilane concentration. The testing results of the product are presented in Example 40.

EXAMPLE 37

This example is concerned with the evaluation of the crosslinking properties of the products of Examples 5, 7, 10, 11, 12, 18 and 19 in a polyurethane dispersion.

The products of Examples 5, 7, 10, 11, 12, 18 and 19 were diluted with an equal volume of water. The dispersions were mixed by stirring by hand with an aqueous carboxyl groups containing polyurethane dispersion available from Stahl Holland B.V. as RU-4385 (hereafter referred to as "RU-4385") at several concentrations. Films of thickness 200 μm and 600 μm were prepared and cured at ambient temperature. The mechanical properties, melting points and swelling percentages in ethanol of the films were determined. In comparative tests, the aziridine crosslinker CX-100 (ICI Resins) and also the polycarbodiimide crosslinkers Bayderm Fix PCL (Bayer) and Ucar XL 25 SE (Union Carbide Corporation) were used.

The results obtained are set out in Table B in which all properties are the average of two experiments.

These results show that crosslinking products, consisting of a chemical composition of carbodiimide functionalities, hydrophilic segments and reactive functional groups have an effect on the crosslinking of RU-4385 films in relation to standard polycarbodiimide crosslinker as indicated by:

At equivalent amounts of crosslinking functions, an increased film strain is obtained.

At equivalent amounts of crosslinking functions, a lower uptake of ethanol is obtained.

At equivalent amounts of crosslinking functions, an increased melting point is observed.

TABLE B

| Crosslinker | | Mechanical properties (MPA) (d) | | | | Elong. (%) | M. Pt (°C.) | Wt Increase (%) |
|---|---|---|---|---|---|---|---|---|
| Wt % | Type (a) (c) | M100 | M200 | M300 | M400 | (e) | (f) | (g) |
| — | — | 1.8 | 2.5 | 3.3 | 3.8 | 560 | 200 | d |
| 1 | CX-100 c) | 2.9 | 4.8 | 7.2 | — | 290 | 245 | 140 |
| 6 | XL 25SE | 2.7 | 3.7 | 4.9 | 6.9 | 450 | 230 | 260 |
| 6 | Fix PCL | 2.5 | 3.4 | 4.5 | 6.2 | 420 | 215 | 270 |
| 7 | Ex. 7 c) | 2.7 | 3.5 | 4.6 | 6.3 | 450 | 230 | 230 |
| 9 | Ex. 5 | 4.2 | 6.2 | — | — | 300 | 245 | 140 |
| 6 | Ex. 5 c) | 3.8 | 5.5 | 8.1 | 12.9 | 340 | 240 | 180 |
| 3 | Ex. 5 | 2.9 | 4.1 | 5.5 | 6.2 | 400 | 225 | 290 |
| 1.5 | Ex. 5 | 2.4 | 3.4 | 4.3 | 5.1 | 500 | 215 | 540 |
| 6 | Ex. 10 c) | 3.0 | 4.4 | 6.3 | 9.1 | 450 | 235 | 270 |
| 6 | Ex. 11 c) | 3.4 | 4.6 | 6.2 | 8.3 | 510 | 235 | 200 |
| 6 | Ex. 12 c) | 3.7 | 5.4 | 7.9 | 12.7 | 360 | 235 | 170 |
| 6 | Ex. 18 c) | 4.0 | 6.2 | 9.3 | — | 280 | 240 | 166 |
| 6 | Ex. 19 c) | 4.3 | 7.2 | 11.6 | — | 350 | 240 | 177 |

Notes to table B
(a) is as defined in Notes to Table A.
(c) c) at the level used, total functionality is equivalent to carboxylic group concentration in the polyurethane dispersion RU-4385 (obtainable from Stahl Holland B.V.). XL 25SE is the polycarbodiimide crosslinker Ucar XL 255SE obtainable from Union Carbide Corporation. Fix PCL is the polycarbodiimide crosslinker Bayderm Fix PCL obtainable from Bayer.
(d) MPA is megapascal ($10^6 NM^{-2}$). The mechanical properties and elongation were measured with films which were stretched at a thickness of 600 μm on an Instron 1025 Tensile Tester. The values at M100, M200, M300 and M400 give tensile strengths of the films while stretching them for respectively 100, 200, 300 and 400%. At the points indicated with "—" the films are broken.
(e) Elong. is the maximal elongation before the film breaks measured on an Instron 1026 Tensile Tester.
(f) M. Pt. is the melting point of the films, measured in a Kofler bank type WME.
(g) Wt Increase is the proportional weight increase of a film drawn by 200 μm and which after drying and curing has lain in alcohol for 20 min at 20° C.; d means that the film dissolves

EXAMPLE 38

This example is concerned with the evaluation of the crosslinking properties of the products of the Examples 7, 29 and 30 in a polyurethane dispersion.

The products of Examples 7, 29 and 30 were diluted with an equal volume of water. The dispersions were mixed by stirring by hand with the aqueous carboxylic groups containing RU-4385 at several concentrations. Films of thickness 200 micrometres and 600 micrometres were prepared and cured at ambient temperature. The mechanical properties, melting point and swelling percentage in ethanol of the cured films were determined. The results obtained are set out in table C in which all properties are the average of two experiments.

TABLE C

| Crosslinker | | Mechanical properties (MPA) (d) | | | | Elong. (%) | M. Pt. (°C.) | Wt Increase (%) |
|---|---|---|---|---|---|---|---|---|
| Wt % | Type (h) | M100 | M200 | M300 | M400 | (e) | (f) (i) | (g) |
| 7 | Ex. 7 c) | 2.8 | 3.6 | 4.8 | 6.5 | 420 | 230 | 230 |
| 12 | Ex. 29 | 5.2 | 7.8 | 12.7 | 19.3 | 350 | b & b | 161 |
| 10 | Ex. 29 c) | 4.7 | 6.9 | 10.5 | 16.0 | 500 | b & b | 176 |
| 6 | Ex. 29 | 3.4 | 4.9 | 7.1 | 8.5 | 550 | b & b | 219 |
| 12 | Ex. 30 c) | 4.6 | 7.9 | — | — | 273 | b & b | 127 |

TABLE C-continued

| Crosslinker | | Mechanical properties (MPA) (d) | | | | Elong. (%) | M. Pt. (°C.) | Wt Increase |
|---|---|---|---|---|---|---|---|---|
| Wt % | Type (h) | M100 | M200 | M300 | M400 | (e) | (f) (i) | (%) (g) |
| — | — | 2.2 | 2.9 | 3.9 | 4.5 | 700 | 200 | d |

Notes to Table C
(c), (d), (e), (f) and (g) are all as defined in notes to Table B.
(h) 7, 29 and 30 are the products of Examples 7, 29 and 30.
(i) b & b - the film became brittle and brown between 220° C. and 260° C., but did not melt.

The results show that the presence of both carbodiimide functions and trimethoxysilyl functions in the same molecule (products of Examples 29 and 30), cause an improved crosslinking effect in films of RU-4385 regarding to polycarbodiimide crosslinkers (product of Example 7) as indicated by:

At comparable carbodiimide concentrations an increased strain of the films is obtained. Films of RU-4385 containing the products of Example 29 and 30 show no melting point, but the films become brown and brittle at temperatures above 220° C.

EXAMPLE 39

This example is concerned with the evaluation of the crosslinking properties of the product of Example 5 in polyacrylate/polymethacrylate emulsions.

The product of Example 5 was diluted with an equal volume of water. The dispersion was mixed by stirring by hand with either RA-38 or Ri-193 (aqueous polyacrylate/polymethacrylate emulsions containing carboxylic groups available from Stahl Holland B.V.). Films of thickness 200 micrometres and 600 micrometres were prepared, dried and cured at ambient temperature. The mechanical properties, melting point and swelling percentage in ethanol of the films were determined. the aziridine crosslinker CX-100 was tested for comparative purposes. The results obtained are set out in table D.

The products of Examples 7, 30, 31, 35 and 36 are diluted with an equal volume of water. The dispersions were stirred by hand into the carboxylic groups containing aqueous polyurethane dispersion RU-4385 in several concentrations. Films of 200 micrometer were prepared, dried and cured at room temperature.

The swelling percentages in ethanol of the cured film were measured. The results are presented in Table E.

TABLE E

| Crosslinker | | Weight increase % |
|---|---|---|
| Wt. % | Type (a) | (g) (h) |
| 7 | Example 7 | 220 |
| 10 | Example 31 | 204 |
| 10 | Example 36 | g |
| 20 | Example 36 | g |
| 12 | Example 30 | 167 |
| 12 | Example 35 | g |
| 24 | Example 35 | g |

Notes to Table E
(a) Examples 7, 31, 36, 30 and 35 are the products of Examples 7, 31, 36, 30 and 35, respectively.
(g) and (h) are as defined in Table D.

The results of Table E show that oligomers with terminal alkoxysilane functions without carbodiimide functions cannot crosslink in a polyurethane comprising carboxylic groups. This follows from the fact that the film of a polyurethane comprising products without

TABLE D

| Poly | Crosslinker | | Mechanical Properties MPA (d) | | | | | Elong. (e) (%) | M. Pt./S. Pt (°C.) (j) | Wt. Inc. % (g) (k) |
|---|---|---|---|---|---|---|---|---|---|---|
| | Wt % | Type (a) | M100 | M200 | M300 | M400 | M500 | | | |
| RA-38 | — | — | 0.20 | 0.21 | 0.21 | 0.21 | 0.21 | >3000 | 165/95 | y |
| RA-38 | 6 | Ex. 5 | 0.59 | 0.89 | 1.28 | 1.75 | 2.23 | 600 | >260/185 | 97 |
| RA-38 | 1 | CX-100 | 2.26 | 6.20 | — | — | — | 240 | >260/220 | 60 |
| Ri-193 | — | — | 0.28 | 0.31 | 0.36 | 0.42 | 0.46 | 1100 | >260/220 | y |
| Ri-193 | 6 | Ex. 5 | 0.74 | 1.19 | 1.87 | — | — | 340 | >260/>260 | 41 |
| Ri-193 | 1 | CX-100 | 1.48 | — | — | — | — | 80 | >260/>260 | 20 |

Notes to table D
(a) is as defined in Notes to Table A.
(d), (e) and (g) are all as defined in Notes to Table B.
(j) M. Pt. and S. Pt. are melting point and softening point respectively and are determined with the Heizbank Kofler System type WME.
(k) y indicates the film absorbs ethanol to form a jelly.

The results in Table D show that the crosslinking agent of Example 5 can be used efficiently in acrylate emulsions, though it is somewhat less effective than the aziridine crosslinker CX-100. An increased strain, higher melting point and better solvent resistance is obtained than with the standard acrylate dispersions.

EXAMPLE 40

This example illustrates the evaluation of the crosslinking properties of the products of Examples 7, 30, 31, 35 and 36.

In this example oligomers with terminal alkoxysilane functions without carbodiimide functions are compared with oligomers having both carbodiimide and alkoxysilane functions.

carbodiimide functions (product from Example 35 or 36) in alcohol takes up so much alcohol that a gelly substance arises which is hardly coherent. When however in the film a product is used containing both carbodiimide and alkoxysilane functions, this film only swells up a little.

EXAMPLE 41

This example illustrates the evaluation of the crosslinking properties of the products of Examples 7 and 30 in a polymethacrylate dispersion.

The products of Examples 7 and 30 were diluted with an equal volume of water. The dispersions were stirred in by hand in the carboxylic groups (obtainable from Stahl Holland b.v.). Films of 200 and 600 micrometers were prepared, dried and cured at room temperature. The mechanical properties, melting points and swelling percentages in ethanol of the cured films were measured. The aziridine crosslinking agent CX-100 was also tested as a reference. The results are presented in Table F.

Table F

The results show that the presence of carbodiimide functions of trimethoxysilyl functions in the same molecule (product from Example 30), while using comparable total concentrations of carbodiimide groups, give an increased crosslinking effect in films of Ri-193 with respect to polycarbodiimide crosslinkers. This appears from:

At comparable concentrations of carbodiimide functions a higher elongation tension of the films is measured.

At equivalent amounts of carbodiimide functions a lower up take of ethanol is obtained.

This increased crosslinking activity may be explained by formation of a network of Si-O-Si bonds throughout the crosslinked polymer system.

TABLE F

| Crosslinker | | Mechanical properties (MPA) (d) | | | | Elong. (%) | M. Pt./ We. Pt. | Wt Increase |
| Wt % | Type (a) | M100 | M200 | M300 | M400 | (e) | (f) | (%) (g) |
| --- | --- | --- | --- | --- | --- | --- | --- | --- |
| — | — | 0.5 | 0.7 | 1.1 | 1.5 | 740 | >260/220 | g |
| 1c) | CX-100 | 1.7 | — | — | — | 180 | >260/>260 | 27 |
| 4 | Ex. 7 | 1.0 | 1.5 | 2.3 | 3.5 | 400 | >260/>260 | 100 |
| 7c) | Ex. 7 | 1.5 | 2.5 | 3.6 | — | 335 | >260/>260 | 88 |
| 4 | Ex. 30 | 0.6 | 1.1 | 1.9 | 2.9 | 460 | >260/>260 | 133 |
| 7 | Ex. 30 | 1.2 | 1.9 | 2.9 | — | 360 | >260/>260 | 64 |
| 12c) | Ex. 30 | 2.1 | 4.0 | — | — | 240 | >260/>260 | 44 |

Notes to Table F
(a) Examples 7 and 30 are the products of Example 7 and 30.
(c) At these concentrations the carbodiimide functionality is 0.75 equivalent to the concentration of carboxylic groups in Ri-193.
(d), (e), (f) and (g) are as defined in Notes to Table B.

We claim:

1. A crosslinking composition which is an oligomeric material which contains carbodiimide functionalities and reactive functional groups which are other than the carbodiimide functional groups.

2. A composition as claimed in claim 1, which contains also hydrophilic segment groups.

3. A composition as claimed in claim 2 in which the weight of hydrophilic segment groups is at least 2%.

4. A composition as claimed in claim 1 which has the general formula (1):

$R^3$ is a divalent organic group containing hydrophilic segments and has no reactivity towards the carbodiimide functions, or the groups $F^1$ and $F^2$;

$R^4$ is a divalent organic group which has no reactivity toward the carbodiimide functions, or the groups $F^1$ and $F^2$;

$R^5$ is a residue of an organic compound adapted to function as a site for branching between a carbodiimide functional group and a group $F^2$;

Q is a residue of an organic compound adapted to function as a site for branching or is a group $—R^1$ or is a group $—R^4—F^1_s$;

$F^1$ is a reactive functional group other than a carbodiimide functional group;

$F^2$ is a reactive functional group other than a carbodiimide functional group;

k has a value of from zero up to ten;
l has a value of from zero up to four;
m has a value of zero up to five;
n has a value from zero up to ten;
o has a value of zero up to five;
p has a value of zero up to four;
q has a value of one up to six;
r has a value of one up to six;
s has a value of one up to six;
x is zero or has a positive value; and
y has a value of at least one, wherein (x+y) corresponds to the valency of the group Q, whereby $R^1$, $R^2$, $R^3$, $R^4$, $R^5$, $F^1$, $F^2$, k, l, m, n, o and p may be the same or different in each group coupled to Q.

5. A composition as claimed in claim 4 wherein the groups ($R^2$—N═C═N), ($R^3$—N═C═N) and $R^5$—$F^2$ are present as blocks of the same type of group, or in a random arrangement of separate groups or as a mixture of both of these.

6. A composition as claimed in either claim 4 wherein the group Q is a monovalent group —$R^1$ or $R^4$—$F^1_s$ and the composition has the general formula (2):

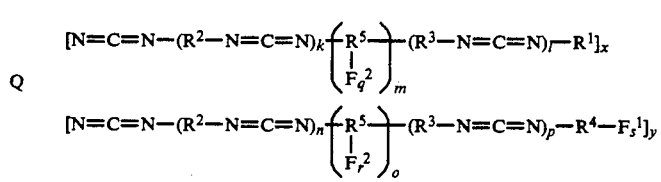

wherein
$R^1$ is a monovalent organic group which has no reactivity towards the carbodiimide functions or the groups $F^1$ and $F^2$;
$R^2$ is a divalent organic group which has no reactivity towards the carbodiimide functions, or the groups $F^1$ and $F^2$;

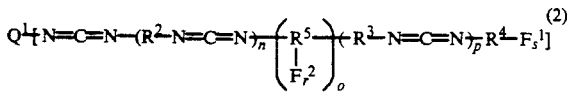

(2)

wherein $R^2$, $R^3$, $R^4$, $R^5$, $F_1$, $F_2$, n, o and p, r and s are all as defined; and $Q^1$ is a group $-R^1$ or $-R^4-F^1_s$ where $R^1$ is as defined.

7. A composition as claimed in claim 6 in which the group Q is a group $-R^4-F^1_s$, the value of o is zero, and the composition has the general formula (3):

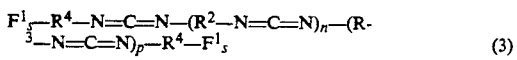

(3)

wherein $R^2$, $R^3$, $R^4$, $F^1$, n, p and s are all as defined and the groups $R^2$, $R^3$, $R^4$ and $F^1$ may be the same or different.

8. A composition as claimed in claim 6 wherein Q is a group $R^1$ and the value of o is zero, so that the compound has the general formula (4):

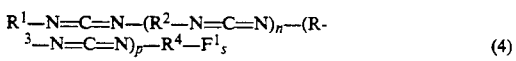

(4)

wherein $R^1$, $R^2$, $R^3$, $R^4$, $F^1$, n, p and s are as defined in claim 4, while $R^1$, $R^2$, $R^3$, $R^4$ and $F^1$ may be the same or different.

9. A composition as claimed in claim 4 which the groups $R^4$ are the same and the groups $F^1$ are the same.

10. A composition as claimed in wherein the group $R^1$ is a terminating group of the carbodiimide functional oligomer or polymer and is a hydrocarbon group which is optionally substituted.

11. A composition as claimed in claim 10 wherein the group $R^1$ contains not more than 25 carbon atoms.

12. A composition as claimed in claim 10 wherein the group $R^1$ contains at least four carbon atoms.

13. A composition as claimed in of claim 10 wherein the group $R^1$ is an alkyl, alkenyl, cycloalkyl, cycloalkenyl, or aryl function and is optionally substituted with substituents which do not interfere with the carbodiimide function or the groups $F^1$ and $F^2$.

14. A composition as claimed in claim 10 wherein the group $R^1$ is the residue of a monoisocyanate, from which the isocyanate function contributes to the carbodiimide formation.

15. A composition as claimed in claim 10 wherein the group $R^1$ is the residue of a diisocyanate of which one isocyanate group is capped by an amino or hydroxy compound and the second isocyanate contributes to the carbodiimide formation.

16. A composition as claimed in claim 4 wherein the group $R^1$ is the residue of a monoaddition product of a diisocyanate and a polyalkoxyalkylamine, a polyalkoxyalkanol, or a polyalkoxyamine or a polyalkoxyalkanol containing a sulphonic acid salt, the second isocyanate function of which contributes to the carbodiimide formation.

17. A composition as claimed in claim 4 wherein the group $R^2$ is an alkyl, alkenyl, cycloalkyl, cycloalkenyl or aryl function, which is possibly substituted with groups who do not react with the carbodiimide function or with the groups $F^1$ and $F^2$.

18. A composition as claimed in claim 4 wherein the group $R^2$ is the hydrocarbon residue from a diisocyanate of which both the isocyanate functions contribute to the carbodiimide formation.

19. A composition as claimed in claim 4 wherein the group $R^3$ is the residue of an addition product formed by the reaction of two diisocyanates whose terminal isocyanate functions contribute to carbodiimide formation and a constituent selected from the group consisting of a polyalkoxy diol, a polyalkoxy diamine, a diol with a polyalkoxy side chain, a diamine with a polyalkoxy side chain, a diol with a polyalkoxy side chain containing a sulfuric salt residue and a diamine with a polyalkoxy side chain containing a sulfuric salt residue.

20. A composition as claimed in claim 4 wherein the group $R^4$ is the residue of the addition product of an aliphatic, cycloaliphatic or aromatic diisocyanate and a hydroxy or amino function connected to a reactive functional group or reactive ring system by an alkyl, cycloalkyl or aryl group, or connected directly to the ring system, and of which the second isocyanate function contributes to the carbodiimide formation.

21. A composition as claimed in of claim 4 wherein the group $R^5$ is the residue of an addition product of two diisocyanates and a dihydroxy, diamino or aminohydroxy compound with a reactive functional group or reactive ring system in the chain or in the side chain, and of which the terminal isocyanate functions contribute to the carbodiimide formation.

22. A composition as claimed in claim 4 wherein the group $R^5$ is the residue of an addition product of diisocyanates and a polyamine or a polyhydroxyl compound, part of which is connected with a reactive functional group analogous to $R^4$ and the residual isocyanate functions contribute to the carbodiimide formation.

23. A composition as claimed in claim 4 wherein the group Q is the residue of a polyisocyanate of which the isocyanate functions contribute to the carbodiimide formation.

24. A composition as claimed in claim 4 wherein the group Q is the residue of an adduct of di- or polyisocyanates with a diol, polyol, diamine, polyamine or aminohydroxy compound, from which the remaining isocyanate functions contribute to the carbodiimide formation.

25. A composition as claimed in any one of claim 4 wherein the groups $F^1$ and $F^2$ are halogens; alkenyls; arylenes; alkynyls; arylynes; alkadienes; aldehydes; dialkylacetals; dithioacetals; ketones; unsaturated aldehydes; ketones or carboxylic esters; nitriles; imines; alkylalkoxysilanes; alkoxysilanes; anhydrides; mixed anhydrides; oxime-protected diisocyanates; diketones; ketoesters; thioketoesters; ketothioesters or thioketothioesters or a mixture of two or more of these groups.

26. A composition as claimed in claim 25 wherein the groups $F^1$ and $F^2$ are trimethoxysilanes or triethoxysilanes.

27. A composition as claimed in claim 25 wherein the groups $F^1$ and $F^2$ are vinyl functions.

28. A composition as claimed in claim 25 wherein the groups $F^1$ and $F^2$ are ketoxime-protected isocyanate functions.

29. A composition as claimed in claim 4 wherein the groups $F^1$ and $F^2$ are any three, four, five, six, seven or eight rings containing one or more nitrogen and/or oxygen and/or sulphur atoms and/or keto functions and/or thioketo functions.

30. A composition as claimed in claim 29 wherein the groups $F^1$ and $F^2$ are an aziridine, epoxide, thiirane, azirine, oxirene, thiirene, azetidine, oxetane, thietane, beta-lactam, beta-lactone, thiethanone, furan, pyrroline, dihydrofuran, dihydrothiophene, pyrrolidine, tetrahydrofuran, tetrahydrothiophene, oxazolidine, dioxolane, oxathiolane, thiazolidine, imidazoline, dithiolane, pyrazolidine, dithiolane, pyrazoline, oxazoline, thiazoline, imidazoline, dioxole, oxazolone, pyrrolidone, butyrolactone, thiobutyrolactone, butyrothiolactone, thiobutyrothiolactone, oxazolidone, dioxolane-2-one, thiazolidinone, dihydropyridine, tetrahydropyridine, pyran, dihydropyran, tetrahydropyran, succinic anhydride, succinimide, thiopyran, dihydrothiopyran, tetrahydrothiopyran, dihydropyrimidine, tetrahydropyrimidine, hexahydropyrimidine, dioxane, morpholine, thiamorpholine, dithiane, triazine.

31. A composition as claimed in claim 30 wherein the groups $F^1$ and $F^2$ are an aziridine, azetidine or epoxide ring.

32. A composition as claimed in claim 30 wherein the groups $F^1$ and $F^2$ are an oxazoline, an oxazolidine or a thiazolidine ring.

33. A composition as claimed in claim 4 wherein the mean value of each of k and n in unbranched systems is from 1 up to 4 and in branched systems a value of 0 up to 4.

34. A composition as claimed in claim 4 wherein the value of each of l and p is from 0.05 up to 2.

35. A composition as claimed in claim 4 wherein the value of each of m and o is from zero up to one.

36. A cmposition as claimed in claim 4 wherein the value of each of q, r and s is 1 or 2.

37. An aqueous emulsion containing a composition as claimed in claim 1.

38. A polymer composition comprising an aqueous polymer solution, dispersion or emulsion containing as a crosslinking agent from 0.5 up to 30% by weight of a composition as claimed in claim 1.

39. A polymer composition as claimed in claim 38 which contains from 2 up to 15% by weight of the crosslinking agent.

40. A process for crosslinking a polymer which comprises effecting crosslinking with a crosslinking agent which is a composition as claimed in claim 1.

41. A process as claimed in claim 40 wherein a polymer containing carboxylic groups is crosslinked.

42. A process as claimed in claim 41 wherein the polymer is a polyurethane, a polyacrylate or a polymethacrylate or a mixture thereof.

43. A process for the preparation an oligomeric material of claim 1 which contains carbodiimide functionalities, hydrophilic segments and reactive functional groups which are other than carbodiimide functional groups which comprises reacting together, under conditions to form carbodiimide functional groups, a diisocyanate, a hydrophilic diol or diamine and optionally a monoisocyanate, continuing reaction until a desired NCO% by weight has been reached in the reaction medium and thereafter reacting the remaining NCO groups with a product containing at least one reactive proton and at least one reactive functional group which is other than a carbodiimide functional group.

* * * * *